(12) United States Patent
Black et al.

(10) Patent No.: US 9,124,355 B2
(45) Date of Patent: *Sep. 1, 2015

(54) TUNABLE NOTCH FILTERING IN MULTI-TRANSMIT APPLICATIONS

(75) Inventors: Gregory R. Black, Vernon Hills, IL (US); Armin W. Klomsdorf, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 13/591,539

(22) Filed: Aug. 22, 2012

(65) Prior Publication Data

US 2014/0055210 A1 Feb. 27, 2014

(51) Int. Cl.
 *H04B 1/44* (2006.01)
 *H04B 1/525* (2015.01)

(52) U.S. Cl.
 CPC ........... *H04B 1/525* (2013.01); *Y10T 29/49117* (2015.01)

(58) Field of Classification Search
 USPC ............. 455/77, 78, 188.1; 370/277; 327/556
 See application file for complete search history.

(56) References Cited

U.S. PATENT DOCUMENTS

| | | | |
|---|---|---|---|
| 6,633,748 B1 * | 10/2003 | Watanabe et al. | 455/78 |
| 6,658,263 B1 * | 12/2003 | Ke et al. | 455/524 |
| 7,773,956 B2 * | 8/2010 | Fukamachi et al. | 455/78 |
| 7,777,597 B2 | 8/2010 | Beaudin et al. | |
| 7,894,779 B2 | 2/2011 | Meiyappan et al. | |
| 8,005,448 B1 | 8/2011 | Yan et al. | |
| 8,682,260 B1 * | 3/2014 | Granger-Jones et al. | 455/77 |
| 8,923,167 B2 * | 12/2014 | Black et al. | 370/277 |
| 2004/0266378 A1 * | 12/2004 | Fukamachi et al. | 455/188.1 |

(Continued)

FOREIGN PATENT DOCUMENTS

| | | |
|---|---|---|
| EP | 2256943 A2 | 12/2010 |
| JP | 2002101005 A | 4/2002 |
| WO | 2007149954 A1 | 12/2007 |
| WO | 2011119460 A1 | 9/2011 |

OTHER PUBLICATIONS

Patent Cooperation Treaty, International Search Report and Written Opinion of the International Searching Authority for International Application No. PCT/US2013/054461, Oct. 30, 2013, 12 pages.

(Continued)

*Primary Examiner* — Junpeng Chen
(74) *Attorney, Agent, or Firm* — Leydig, Voit & Mayer, Ltd.

(57) ABSTRACT

A radio frequency (RF) communication device comprises a first signal propagating circuit and a second signal propagating circuit, which together enables simultaneous transmission. The first signal propagating circuit is configured with a first tunable notch filter within a first transmit path and the second signal propagating circuit is configured with a second tunable notch filter within a second transmit path. A controller is communicatively coupled to a respective first tuning component and second tuning component of the tunable notch filters. The controller selectively tunes at least one of the tunable notch filters during signal propagation to produce a specific combined notch filtering response that reduces a level of IMD on at least one receive carrier frequency of at least one propagating signal. Aspects of the disclosure also provide a method for making the communication device.

17 Claims, 9 Drawing Sheets

(56) References Cited

U.S. PATENT DOCUMENTS

| | | | |
|---|---|---|---|
| 2009/0096517 A1* | 4/2009 | Huang et al. | 327/556 |
| 2010/0118921 A1 | 5/2010 | Abdelmonem et al. | |
| 2011/0294443 A1 | 12/2011 | Nohra et al. | |
| 2012/0113874 A1* | 5/2012 | Sanguinetti | 370/277 |

OTHER PUBLICATIONS

International Bureau of WIPO, International Preliminary Report on Patentability in International Patent Application No. PCT/US2013/054461 (Mar. 5, 2015).

* cited by examiner

900

902 — First Notch Filter C11(pF)

| 1st Transceiver Band ↓ | 1st Transceiver Channel ↓ | 2nd Transceiver Band → 2nd Transceiver Channel → | | | | | |
|---|---|---|---|---|---|---|---|
| | | 5 | 5 | 5 | off | off | off |
| | | low | mid | high | low | mid | high |
| 12 | low | 1.1 | 1 | 1 | 1 | 1 | 1 |
| 12 | mid | 1.1 | 1.2 | 1 | 1 | 1 | 1 |
| 12 | high | 1 | 1.1 | 0.9 | 1 | 1 | 1 |
| off | n/a | 1.6 | 1.6 | 1.6 | n/a | n/a | n/a |
| off | n/a | 1.6 | 1.6 | 1.6 | n/a | n/a | n/a |
| off | n/a | 1.6 | 1.6 | 1.6 | n/a | n/a | n/a |

904 — First Notch Filter C12(pF)

| 1st Transceiver Band ↓ | 1st Transceiver Channel ↓ | 2nd Transceiver Band → 2nd Transceiver Channel → | | | | | |
|---|---|---|---|---|---|---|---|
| | | 5 | 5 | 5 | off | off | off |
| | | low | mid | high | low | mid | high |
| 12 | low | 11.6 | 11 | 11 | 8 | 8 | 8 |
| 12 | mid | 11.4 | 11.6 | 11.4 | 8 | 8 | 8 |
| 12 | high | 11.6 | 11.6 | 11 | 8 | 8 | 8 |
| off | n/a | 12 | 12 | 12 | n/a | n/a | n/a |
| off | n/a | 12 | 12 | 12 | n/a | n/a | n/a |
| off | n/a | 12 | 12 | 12 | n/a | n/a | n/a |

906 — Second Notch Filter C21(pF)

| 1st Transceiver Band ↓ | 1st Transceiver Channel ↓ | 2nd Transceiver Band → 2nd Transceiver Channel → | | | | | |
|---|---|---|---|---|---|---|---|
| | | 5 | 5 | 5 | off | off | off |
| | | low | mid | high | low | mid | high |
| 12 | low | 0.5 | 0.6 | 1.1 | 0.2 | 0.2 | 0.2 |
| 12 | mid | 0.7 | 0.5 | 0.2 | 0.2 | 0.2 | 0.2 |
| 12 | high | 0.2 | 0.2 | 1.3 | 0.2 | 0.2 | 0.2 |
| off | n/a | 1.3 | 1.3 | 1.3 | n/a | n/a | n/a |
| off | n/a | 1.3 | 1.3 | 1.3 | n/a | n/a | n/a |
| off | n/a | 1.3 | 1.3 | 1.3 | n/a | n/a | n/a |

908 — Second Notch Filter C22(pF)

| 1st Transceiver Band ↓ | 1st Transceiver Channel ↓ | 2nd Transceiver Band → 2nd Transceiver Channel → | | | | | |
|---|---|---|---|---|---|---|---|
| | | 5 | 5 | 5 | off | off | off |
| | | low | mid | high | low | mid | high |
| 12 | low | 21.4 | 21.2 | 21.4 | 20 | 20 | 20 |
| 12 | mid | 21.4 | 21.4 | 20.8 | 20 | 20 | 20 |
| 12 | high | 20.8 | 21.2 | 20.8 | 20 | 20 | 20 |
| off | n/a | 32 | 32 | 32 | n/a | n/a | n/a |
| off | n/a | 32 | 32 | 32 | n/a | n/a | n/a |
| off | n/a | 32 | 32 | 32 | n/a | n/a | n/a |

*FIG. 9*

TUNABLE NOTCH FILTERING IN MULTI-TRANSMIT APPLICATIONS

BACKGROUND

1. Technical Field

The present invention generally relates to communication devices and in particular to communication devices designed with a multiple transmitter configuration to enable simultaneously transmissions.

2. Description of the Related Art

Communication devices supporting simultaneous voice and data, or multicarrier data, employ multiple simultaneously operating transmitters. These transmitters have to be isolated from each other to avoid intermodulation, which can cause receiver desensitization, spurious emissions, and other problems. Conventional designs of a multi-transmitter device include simultaneous voice and LTE (SVLTE) product transceivers, which employ radio frequency (RF) front end designs having notch filtering for isolating the simultaneous transmitters. For example, RF front end designs employ notch filters to isolate the voice transmit path from the data transmit path, in order to reduce intermodulation distortion. However, with these notch filter implementations, the notch filters have insertion loss which affects the transmitter output power and/or efficiency as well as the receiver sensitivity. While the higher insertion loss can be okay in SVLTE mode, where some back-off of transmit power and degradation of receiver sensitivity is expected, the insertion loss affects the radio performance in non SVLTE operation, which is problematic. The degradation of radio performance becomes more severe in cases where the simultaneous transmitters occur at closer frequency spacing at which the notch filter insertion losses are higher, and is most severe for intraband simultaneous transmissions.

Carrier Aggregation (CA) products or devices have similar problems to the aforementioned SVLTE products, whereby simultaneous data transmission paths need to be isolated in order to minimize the generation of intermodulation distortion. Like in the SVLTE cases, fixed notch filter arrangements can be used for interband simultaneous data transmission carrier aggregation to isolate the transmit paths. However, in the intraband case, in which both data signals are in the same band, fixed notch filters cannot be utilized and/or are incapable of isolating the transmitters.

BRIEF DESCRIPTION OF THE DRAWINGS

The disclosure will best be understood by reference to the following detailed description of illustrative embodiments when read in conjunction with the accompanying drawings, wherein:

FIG. 9 illustrates tables providing a mapping of parameter values for the internal components of the tunable notch filters based on the frequency bands, in accordance with one or more embodiments.

DETAILED DESCRIPTION

Figure 1:
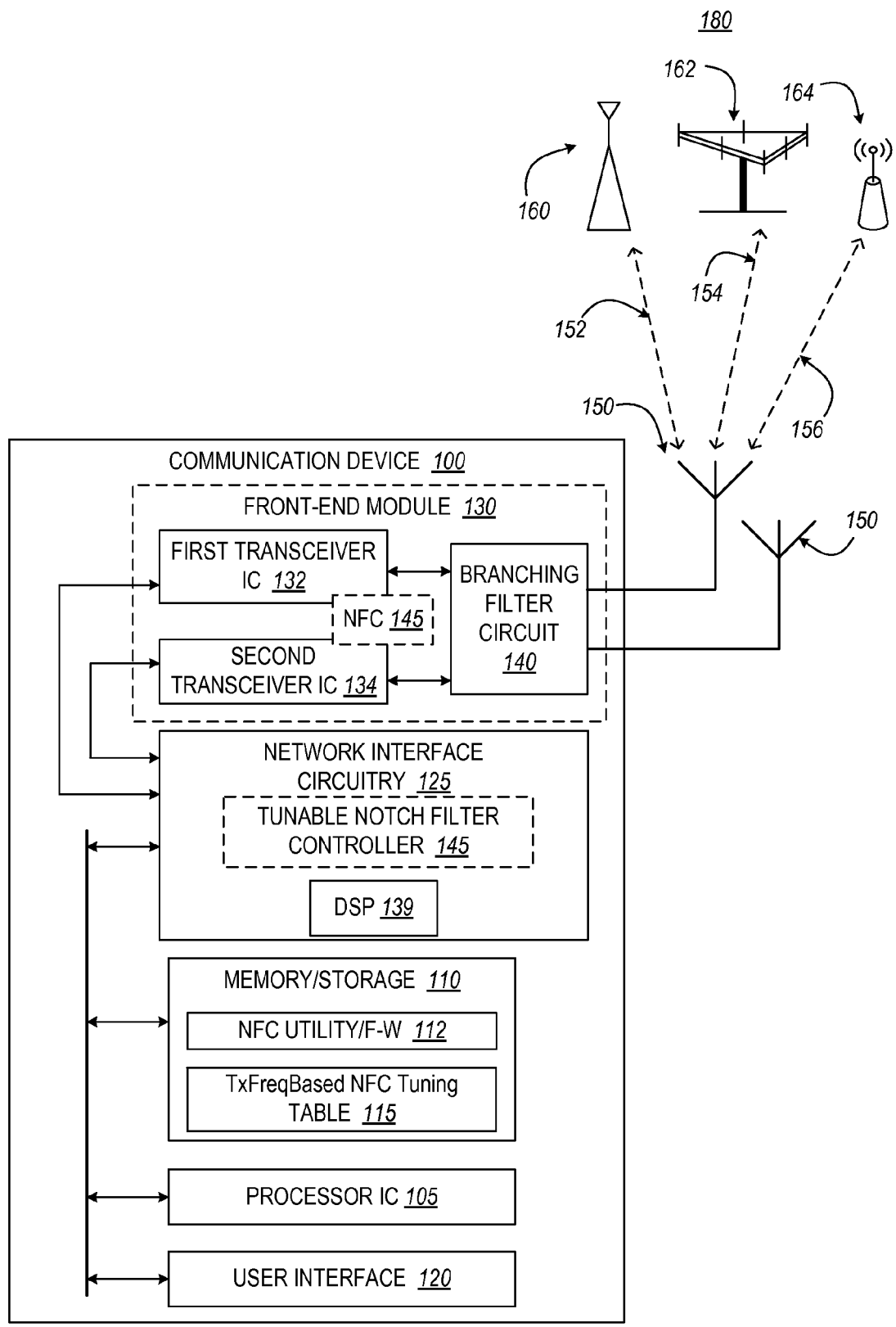
FIG. 1 provides a block diagram representation of an example communication device having multiple transceivers and within which the various features of the disclosure can be implemented, according to one embodiment.

The illustrative embodiments provide a radio frequency (RF) communication device capable of simultaneous transmission of multiple signals and a method performed by the communication device. The communication device and method reduces intermodulation distortion (IMD) when the device is operating in both a single transmission mode and in a simultaneous, multi-transmission mode. The communication device comprises a first signal propagating circuit that enables transmission of a first signal along a first transmits path from the communication device and a second signal propagating circuit capable of simultaneously transmitting a second signal along a second signal path, while the first signal is being transmitted along the first transmit path. The first signal propagating circuit is configured with a first tunable notch filter coupled within a first transmit path associated with a first transmitter and the second signal propagating circuit is configured with a second tunable notch filter coupled within a second transmit path associated with a second transmitter. The communication device further includes a controller communicatively coupled to a first tuning component that is a part of the first tunable notch filter and communicatively coupled to a second tuning component that is a part of the second tunable notch filter. The controller: selectively tunes at least one of the first tunable notch filter and the second tunable notch filter during signal propagation through a propagation path including at least one of the first tunable notch filter and the second tunable notch filter. The selective tuning of the at least one tunable notch filter produces a specific combined notch filtering response that reduces a level of IMD on at least one receive carrier frequency of at least one propagating signal. Aspects of the disclosure also provide a method for making the communication device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

With reference now to the figures, and beginning with FIG. 1, there is depicted a block diagram representation of an example communication device 100 operating within a wireless communication network 180, generally represented by a collection of base stations 160, 162, 164. As presented herein, wireless communication network 180 and communication device 100 can both support multiple communication protocols and/or multiple radio access technologies that allow for simultaneous transmission and simultaneous reception of signals from/to communication device 100.

Communication device 100 can be one of and be referred to as a system, device, subscriber unit, subscriber station, mobile station (MS), mobile, mobile device, remote station, remote terminal, access terminal, user terminal, terminal, communication device, user agent, user device, user equipment (UE), cellular telephone, a satellite phone, a cordless telephone, a Session Initiation Protocol (SIP) phone, a wireless local loop (WLL) station, a personal digital assistant (PDA), a handheld device having wireless connection capability, a computing device, such as a laptop, tablet, smart phone, personal digital assistant, or other processing devices connected to a wireless modem. Communication device 100 comprises processor integrated circuit (IC) 105 that is connected to memory 110 via a bus interface. Processor IC 105 can include one or more programmable microprocessors, such as a data processor and a digital signal processor (DSP). The processor IC 105 controls the communication and other functions and/or operations of the communication device 100. These functions and/or operations can include, but are not limited to, application data processing and signal processing.

Memory 110 can include volatile memory and/or non-volatile memory. One or more applications can be stored within memory and executed by a processor on processor IC 105. For example, memory 110 is illustrated as having notch filter controller utility or firmware 112 and associated NFC tuning table 115. The associated functionality and/or usage of both software modules will be described in greater detail within the descriptions which follow. Communication device 100 also comprises one or more user interfaces 120, including one or more input devices, such as a keypad, touch screen, touch pad, and microphone, and/or one or more output devices, such as speaker, haptic interface, display and others.

Communication device 100 also comprises network interface circuitry 125 and front-end module 130. Front-end module 130 includes first transceiver IC 132, second transceiver IC 134, and branching filter circuit 140. Communication device 100 also comprises at least one antenna 150 coupled to branching filter circuit 140. Two antennas 150 are presented, describing one embodiment which supports simultaneous transmission. The simultaneous transmission in different frequency bands enables communication with more than one network node, more than one Radio Access Network (RAN), and/or more than one Radio Access Technology (RAT). For example, a first air interface 152 between communication device 100 and first node or base station 160 can be used to communicate with a first cellular technology supported by first base station 160. A second air interface 154 between communication device 100 and second node or base station 162 can be used to communicate with a second cellular technology supported by second base station 162. A third air interface 156 between communication device 100 and third node or base station 164 can be used to communicate with a wireless access technology that can involve a personal access network or an access point as third base station 164. Each of the base stations 160, 162, 164 provides wireless service to user equipment (UEs) or mobile stations (MSs), such as communication device 100, located within a corresponding coverage area. Simultaneous transmissions can also enable multicarrier transmission between communication device 100 and a single base station 160, 162 or 164.

According to one aspect of the disclosure, communication device 100 is configured to support simultaneous transmission with at least two transceivers. In particular, front-end module 130, configured with first transceiver IC 132 and second transceiver IC 134, converts baseband signals into radio frequencies for transmission and converts received radio frequencies into baseband signals for further processing. As described with reference to FIG. 2 hereafter, branching filter circuit 140 of front-end module 130 performs the necessary (a) duplexing for, or frequency selective distributing, the transmission and received signals between at least one antenna 150 and the two transceivers 132, 134 and (b) diplexing for combining different frequencies as required for these signal distributions.

According to one embodiment, the processor IC 105 can utilize network interface 125 to encode baseband signals for transmitting by front-end module 130 and to decode received baseband signals received by front-end module 130 during signal transmission to and/or reception from communication network 180. During signal communication, the front-end module 130 performs Radio Frequency (RF) modulation for high speed data transmission, converting between digital baseband signals and analog RF. The branching filter circuit 140 of the front-end module 130 connects each of first transceiver IC 132 and second transceiver IC 134 to at least one antenna 150 for transmitting and receiving signals. In particular, the branching filter circuit 140 performs a duplexing function whereby transmit signals are filtered and distributed to the at least one antenna 150 and received signals are filtered and distributed to the appropriate transceiver (132, 134). The branching filter circuit 140 can also perform diplexing (combining) of the transmit signals from the first and second transceivers 132, 134.

As described in greater detail with reference to FIG. 2, a branching filter circuit 140 employs notch filtering, and in particular, tunable notch filters, to reduce intermodulation distortion (IMD) while performing the simultaneous transmissions capable of being provided by communication device 100. To support use of the tunable notch filters, front-end module 130 also comprises tunable notch controller functionality, which is illustrated as notch filter controller (NFC) 145. Notch filter controller 145 can be a separate functional block having an integrated processor or can be a programmable function (firmware code) integrated within one of the other devices within front-end module 130. For example, notch filter controller 145 can be implemented via execution of firmware stored within non volatile storage located on front-end module 130, where the execution occurs via a dedicated processor also on front-end module 130. Alternatively, notch filter controller 145 can be a functional utility executed by DSP 139 within network interface circuitry 125, or the functionality can be provided via functional utility or firmware 112 within memory 110 that is executed by processor on processor IC 105. Other implementations of notch filter controller 145 are also possible.

Figure 2:
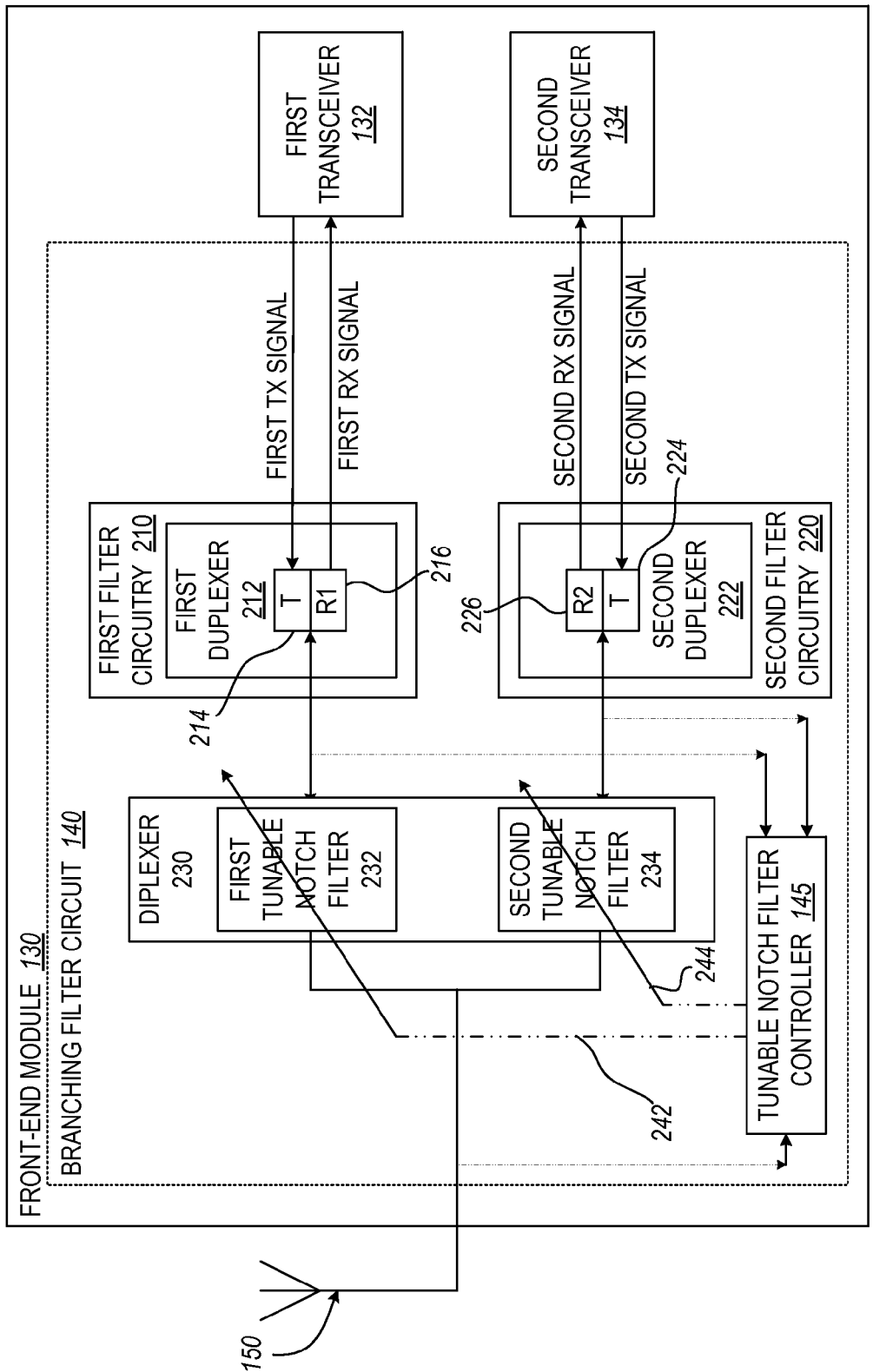
FIG. 2 provides an exemplary schematic block diagram of components within a branching filter circuit of a front-end module of the communication device of FIG. 1, according to one embodiment.

Turning now to FIG. 2, there is illustrated a more detailed diagram of the interconnected physical components that make up branching filter circuit 140, including the tunable notch filters and associated notch filter controller, according to one embodiment. Functionally, branching filter circuit 140 is configured in a non-band swapped duplexer arrangement. Branching filter circuitry 140 comprises first filter circuitry 210, second filter circuitry 220, diplexer 230, and first transceiver 132 and second transceiver 134. Diplexer 230 comprises first tunable notch filter 232 and second tunable notch filter 234 and other components for communicatively connecting the first transceiver 132 and second transceiver 134 to the at least one antenna 150. In the illustrative embodiment of FIG. 2, tunable notch filter controller 145 is located within branching filter circuit 140. As previously described however, the specific location of this controller 145 can vary depending on implementation. Regardless of the location, however, tunable notch filter controller 145 provides two control interfaces 242, 244 that respectively connect to a tuner of each of first tunable notch filter 232 and second tunable notch filter 234. In one or more embodiments (not specifically shown), tunable notch filter controller 145 also receives input information corresponding to transmit and receive signals propagating through front-end module 130. Tunable notch filter controller 145 decides the level of tuning required for one or both of the tunable notch filters 232, 234 based on the detected transmission and reception of communication signals from and to one or both of the transmit and/or receive paths for first transceiver 132 and/or second transceiver 134.

As shown, first filter circuitry 210 is connected between first transceiver 132 and the first tunable notch filter 232 of the diplexer 230. First tunable notch filter 232 is further connected to the at least one antenna 150. As further illustrated, first filter circuitry 210 comprises a first duplexer 212 that includes a first transmit band-pass filter 214 that can transmit a first transmit signal in a first transmit frequency band from the first transceiver 132 to the at least one antenna 150 via the first tunable notch filter 232. The first duplexer 212 also has a first receive band-pass filter 216 that can transmit a first receive signal in a first receive frequency band to the first transceiver 132. Second filter circuitry 220 comprises a second duplexer 222 that is connected between the second transceiver 134 and the second tunable notch filter 234 of diplexer 230. The second duplexer 222 has a second transmit band-pass filter 224 that transmits a second transmit signal in a second transmit frequency band from the second transceiver 134 to the at least one antenna 150 via the second tunable notch filter 234. The second duplexer 222 has a second receive band-pass filter 226 that transmits a second receive signal in the second receive frequency band received from the second tunable notch filter 234 to the second transceiver 134. In an alternative band-swapped arrangement (not shown) first receive band pass filter 216 can transmit the second receive signal in the second receive frequency band to the second transceiver 134, and second receive band pass filter 226 can transmit the first receive signal in the first receive frequency band to the first transceiver 132.

According to one embodiment, the branching filter circuit 140 performs duplexing of two transmitted signals and two received signals. In particular, the branching filter circuit 140 transmits a first transmit signal in a first transmit frequency band from the first transceiver 132 to the at least one antenna 150 and transmits a selected one of a first receive signal in the first receive frequency band and a second receive signal in a second receive frequency band from antenna 150 to a selected one of first transceiver 132 and second transceiver 134. The branching filter circuit 140 transmits a second transmit signal in a second transmit frequency band from the second transceiver 134 to the at least one antenna 150 and transmits another one of the first receive signal in the first receive frequency band and the second receive signal in the second receive frequency band from antenna 150 to a another one of a first transceiver 132 and second transceiver 134.

With the provided configuration, diplexer 230 is formed from the first tunable notch filter 232 and the second tunable notch filter 234. The first tunable notch filter 232 transmits signals in the first transmit frequency band from the first duplexer 212 to the at least one antenna 150. The first tunable notch filter 232 transmits signals in the first receive frequency band from the at least one antenna 150 to the first duplexer 212. Based on control input signals received from tunable notch filter controller 145, first tunable notch filter 232 can attenuate the second transmit signal in the second transmit frequency band received from the second filter circuitry 220 via second tunable notch filter 234. Similarly, second tunable notch filter 234 transmits signals in the second transmit frequency band from the second duplexer 222 to the at least one antenna 150. The second tunable notch filter 234 transmits signals in the second receive frequency band from the at least one antenna 150 to the second duplexer 222. Based on control input signals received from tunable notch filter controller 145, second tunable notch filter 234 can deterministically attenuate the first transmit signal in the first transmit frequency band received from the first filter circuitry 210 via first notch filter 232.

Accordingly, branching filter circuit 140 diplexes the first and second transmit (Tx) signals and the first and second receive (Rx) signals by using tunable notch filtering to transmit receive signals in the selected one of a first receive frequency band and a second receive frequency band, to transmit the first transmit signal in the first transmit band, and to attenuate the second transmit signal in the second transmit frequency band. Branching filter circuit 140 also diplexes the first and second transmit signals and the first and second receive signals by using tunable notch filtering to transmit signals in the other one of the first receive frequency band and the second receive frequency band, to transmit the second transmit signal in the second transmit band, and to attenuate the first transmit signal in the first transmit frequency band. By employing tunable notch filters in branching filter circuit 140, the first transmit signal can be selectively attenuated into the second transceiver 134 and the second transmit signal can be selectively attenuated into the first filter circuitry 210 and first transceiver 132, thereby reducing intermodulation distortion. Since the tunable notch filters use the minimum number of resonators to reject only the transmit signal frequencies needed to reduce the generation of intermodulation distortion, the size and cost are reduced compared to fixed notch filter implementations.

According to one or more embodiments, communication device 100 is a radio front end or a device comprising a radio front end, which isolates multiple transmission paths during device operation in a simultaneous, multi-transmission mode, but does not cause added insertion losses when the device is operating in a single transmission mode. Communication device 100 is designed to support multi-transmission mode by employing tunable notch filters within the transmit paths. Communication device 100 allows for isolating intra-band carriers in the simultaneous multi-carrier transmission mode, while minimally impacting insertion loss when only one carrier is present, as in the single-carrier transmission mode. In one embodiment, first and second carriers are isolated by operating a tunable notch filter at the output of the first band transmitter, and tuning the tunable notch filter to the frequency of the second band transmitter when the second band transmitter is active. However, when the second band transmitter is inactive, the tunable notch filter is tuned out of band relative to the first band to minimize insertion loss. According to one aspect, the notch frequency is tunable within a transmit band, i.e., intra-band tuning, as opposed to requiring inter-band level tuning in which an entire band is rejected. By enabling this level of in-band tuning granularity, the design allows the notch filter to be tuned exactly onto the second transmit frequency, thereby further enabling intra-band operation. These functional aspects of the disclosure are described in more detail with reference to the remaining figures.

Figure 3:
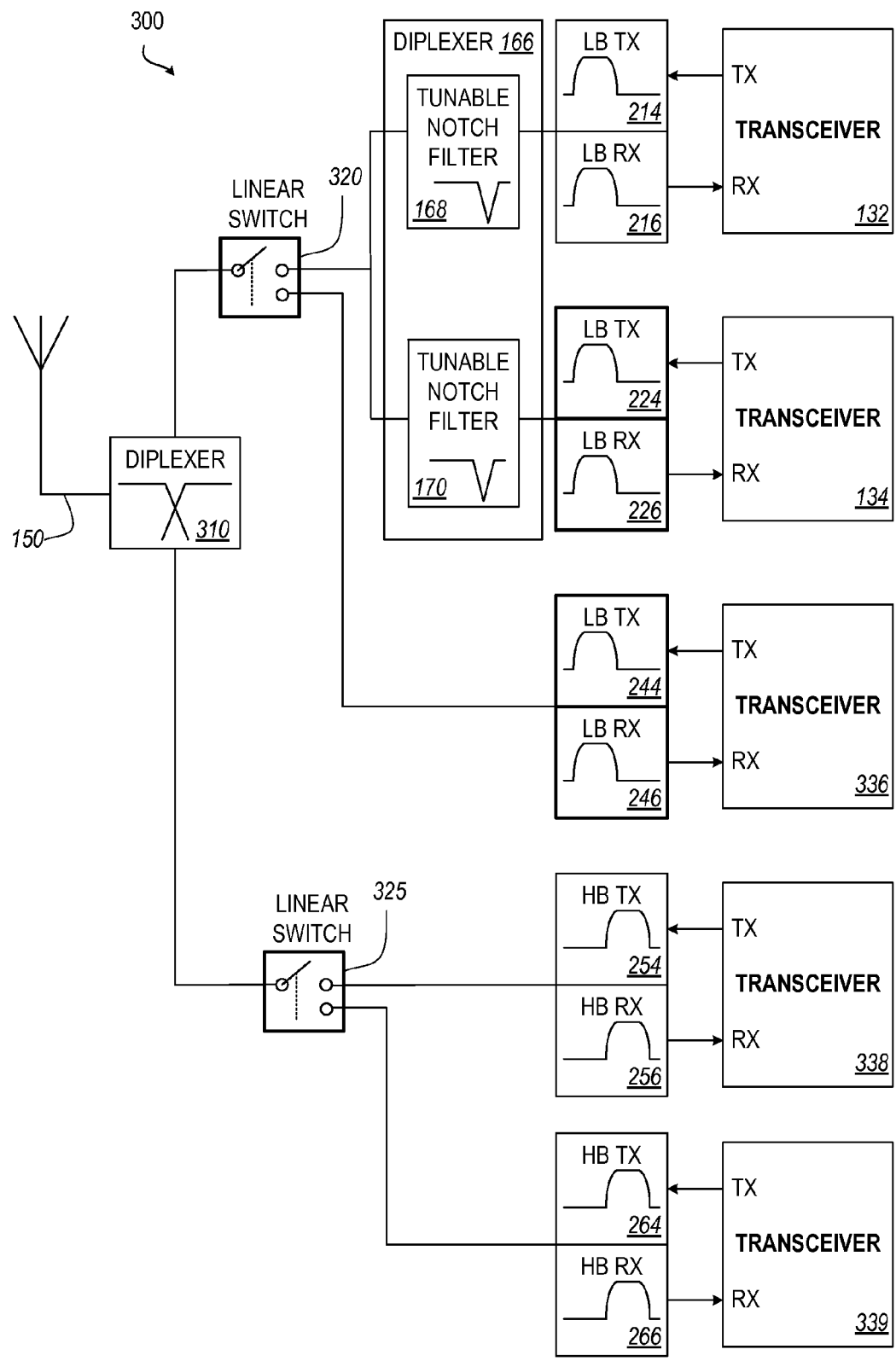
FIG. 3 provides an exemplary schematic block diagram of components of a front end module of a communication device having tunable notch filters, according to one or more embodiments.

FIG. 3 provides one embodiment of front-end module 130 of communication device 100 (FIG. 1), which incorporates the first and second transceivers 132, 134 for a cellular low band operation, while providing additional transceivers. Unlike the previous representations in FIGS. 1 and 2, in addition to first transceiver 132 and second transceiver 134, communication device 300 includes third low band transceiver 336 and corresponding third transceiver path and a fourth transceiver 338 and a fifth transceiver 339. Fourth and Fifth transceivers 338, 339 are high band transceivers. Also, wideband diplexer 310 is coupled to the at least one antenna 150 and forwards low band duplexed signal to a linear switch 320 provided to control which of two propagation paths are to be utilized for signal propagation. In the presented example, first and second low band transceivers 132, 134 can transmit simultaneously. Also, one of the high band transceivers 338 or 339 can transmit simultaneously with one of the low band transceivers 132 or 134. The branching filter circuit 140 incorporates high linearity switch 320 to selectively connect to wideband diplexer 310 one or both of transceivers 132 and 134, and transceiver 336. In one embodiment, the high linearity switch is a PIN diode based switch. Importantly, linear switch 320 must have high linearity when transceivers 132 and 134 are operating simultaneously. The linearity of linear switch 320 refers to its capability to transmit two transmit signals without generating a high level of intermodulation distortion. Third transceiver 336 transmits and receives through a duplex filter comprising transmit filter 244 and receive filter 246, which connects to the antenna 150 via linear switch 320 and wideband diplexer 310. Fourth transceiver 338 of the front-end module operates in a cellular high-band. Fourth transceiver 338 transmits and receives through a duplex filter comprising transmit filter 254 and receive filter 256, which connects to the antenna 150 via wideband diplexer 310. Fifth transceiver 339 of the front-end module operates in a cellular high-band. Fifth transceiver 339 transmits and receives through a duplex filter comprising transmit filter 264 and receive filter 266, which connects to the antenna 150 via wideband diplexer 310.

With the above provided configurations of communication device 100 and particularly front-end module 130, either of the tunable notch filters (132, 134) can be tuned out of band such that insertion loss of the particular filter is minimized during single carrier operation by the communication device 100. According to one aspect of the disclosure, the design employing the tunable notch filters can be utilized in a variety of different devices covering both inter-band and intra-band carrier aggregation (CA) implementation. In another embodiment, utilized for the intra-band CA implementation, a front-end module is provided in which the two transmit signals are combined at the input of one of the power amplifiers (PAs) (not shown) within the module, and the output signal is propagated along two paths, each having one of the tunable notch filters located within the path. With this configuration, notch filtering can be utilized to reduce intermodulation generated in circuits, such as duplex filters and RF switches, between the PA and antenna.

Figure 4:
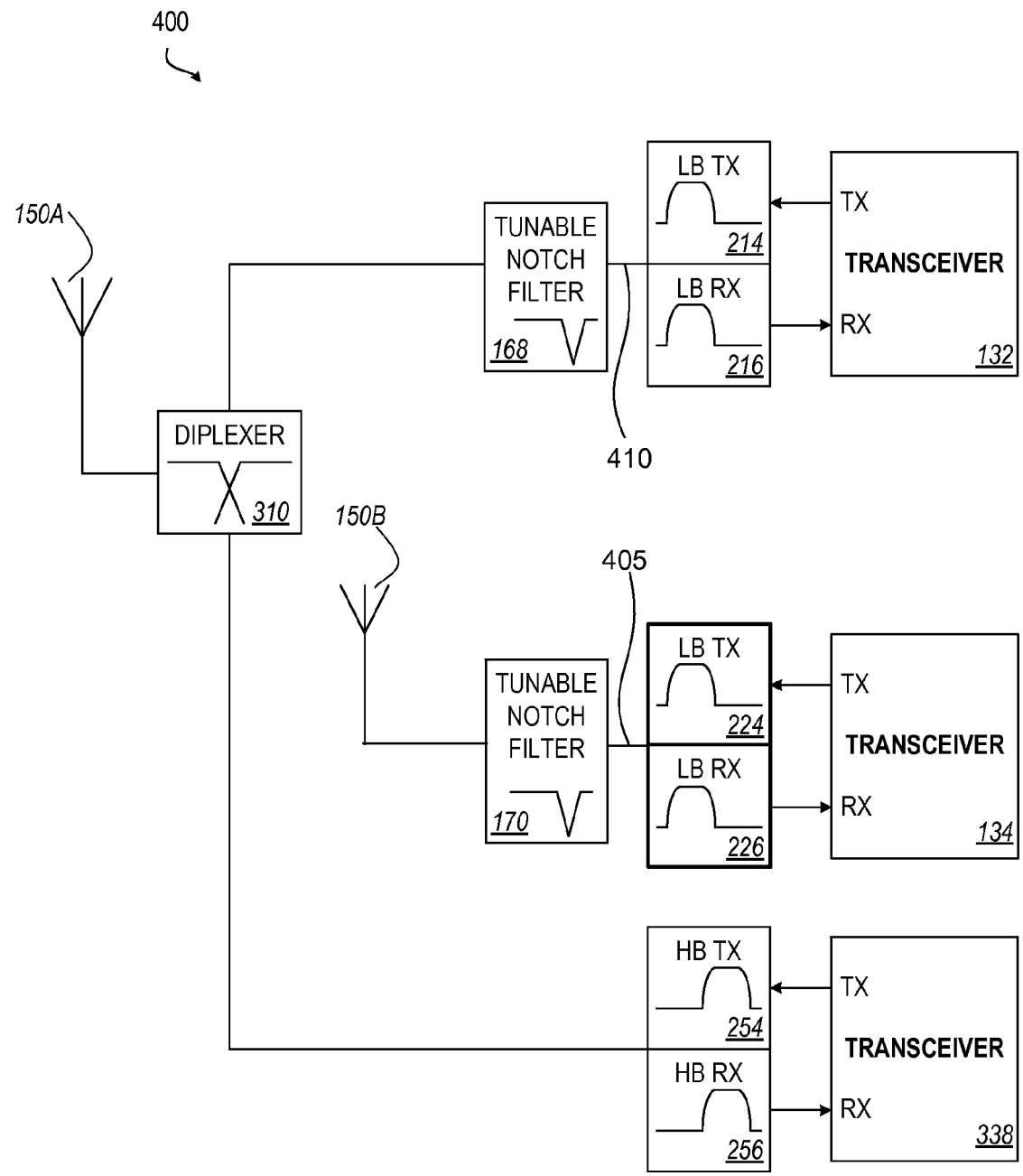
FIGS. 4 and 5 present two alternate configurations of components within a front-end module having tunable notch filters, according to alternate embodiments.
Figure 5:
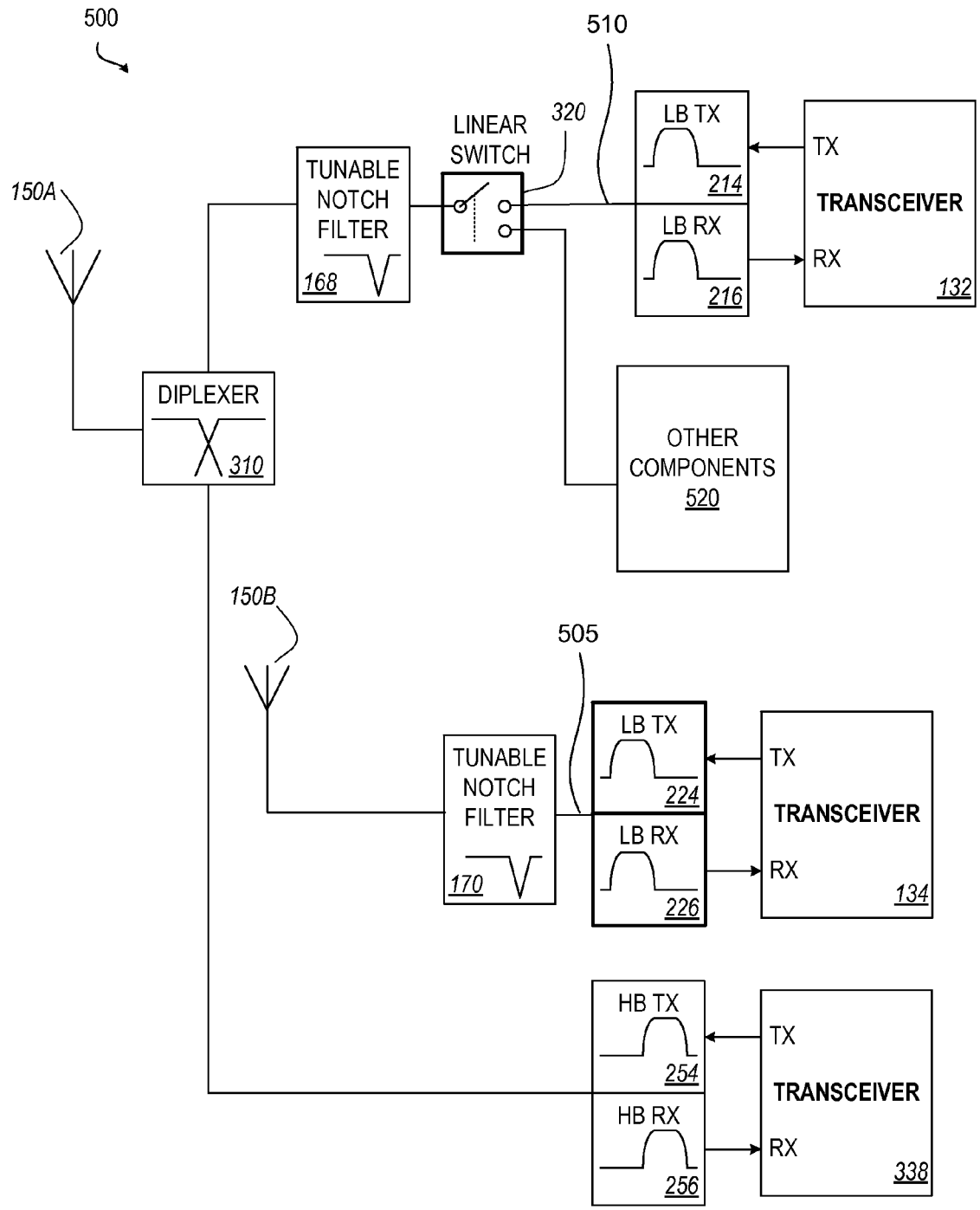

In alternate embodiments, a separate antenna can be used for simultaneously transmitting the first transmit signal from first transceiver 132 and the second transmit signal from the second transceiver 134. In this way the isolation of the first transmit signal to the second filter circuitry 220 and transceiver 134 is increased by the antenna-to-antenna isolation, compared to single antenna embodiments. Also, the isolation of the second transmit signal to the first filter circuitry 210 and first transceiver 132 is increased by the antenna-to-antenna isolation, compared to single antenna embodiments. Examples of these alternate embodiments are provided by front-end modules 400 and 500 shown in FIGS. 4 and 5, respectively. FIGS. 4 and 5 are presented for illustration purposes only. Each respective front-end module 400 and 500 includes similar components as the components presented in FIG. 3, which components have been previously described. However, the components of FIGS. 4 and 5 are interconnected in different arrangements from the arrangement of FIG. 3 and from each other. In FIG. 4, both tunable notch filters are associated with low band signal propagation paths. A first signal propagation path over which second transmit signal 410 propagates comprises first antenna 150A, wideband diplexer 310, first tunable notch filter 168 and first transceiver 132. A second signal propagation path over which first transmit signal 405 propagates then comprises second antenna 150B, second tunable notch filter 170 and second transceiver 134. High band signals propagate between first antenna 150A and third transceiver 338 via a propagation path that also includes wideband diplexer 310. FIG. 5 is similarly configured, but also includes an additional linear switch 320 coupled between first tunable notch filter 168 and first transceiver 132. The linear switch 320 enables the coupling of other components 520 to first tunable notch filter 168.

With each of the front-end modules of FIG. 4 and FIG. 5, the transceivers 132 and 134, which can operate simultaneously, employ separate antennas 150A and 150B, respectively. The isolation between antennas 150A and 150B provides additional isolation of the first transmit signal 405, 505 to the second filter circuitry 224, 226 and the second transceiver 134. The isolation between antennas 150A and 150B also provides additional isolation of the second transmit signal 410, 510 to the first filter circuitry 214, 216 and the first transceiver 132. With both of these configurations, the transmit path and receive paths operate in different band frequencies.

Several aspects of the disclosure are presented by one or more of the embodiments illustrated with FIGS. 1-5. As described, these embodiments generally provide a radio frequency (RF) communication device comprising: a first signal propagating circuit that enables transmission of a first signal from the communication device, wherein the first signal propagating circuit is configured with a first tunable notch filter coupled within a first transmit path associated with a first transmitter; a second signal propagating circuit capable of simultaneously transmitting a second signal while the first signal is being transmitted along the first transmit path. The second signal propagating circuit is configured with a second tunable notch filter coupled within a second transmit path associated with a second transmitter. The communication device further comprises: a controller communicatively coupled to a first tuning component of the first tunable notch filter and to a second tuning component of the second tunable notch filter and which: selectively tunes at least one of the first tunable notch filter and the second tunable notch filter during signal propagation to produce a specific combined notch filtering response that reduces a level of intermodulation distortion (IMD) on at least one receive carrier frequency of at least one propagating signal that propagates along a transmission path including at least one of the first tunable notch filter and the second tunable notch filter. According to one embodiment, to selectively tune at least one of the first tunable notch filter and the second tunable notch filter, the controller: detects that the communication device is actively operating in simultaneous, multi-transmission mode; and in response to detecting that the communication device is operating in a simultaneous multi-transmission mode, retrieves tuning values from a pre-stored data structure or table (e.g., table 800 of FIG. 8) of tunable values correlated to detected operating conditions related to the particular simultaneous, multi-transmission mode, and selectively tunes each of the first tunable notch filter and the second tunable notch filter to a tunable state that reduces the IMD level caused by each transmit carrier frequency of the second signal and the first signal respectively. According to one aspect of the disclosure, the first signal and the second signal are respective first and second signals in one of a simultaneous voice and Long Term Evolution (SVLTE) propagation, simultaneous voice and data only (SVDO) propagation, inter-band carrier aggregation (CA) propagation, and intra-band CA propagation.

In another embodiment, to selectively tune at least one of the first tunable notch filter and the second tunable notch filter, the controller: detects that the communication device is actively operating in a single transmission mode; and, in response to detecting that the communication device is operating in single transmission mode, detects which one of the first transmitter and the second transmitter is an active transmitter that is currently performing signal transmission within an active signal propagation path, and the controller selectively tunes: (a) one notch filter of the first notch filter and the second notch filter that is associated with the active transmitter path to at least one of an out-of-band position relative to the frequency band of the signal being transmitted via the active transmitter and a low loss state, in order to minimize an insertion loss of the one notch filter during single carrier operation; and (b) the other notch filter not associated with the active transmitter path to a low loss state in the active transmitter path. According to one aspect, the active signal propagation includes both transmit and receive paths.

In one embodiment, the first tunable notch filter and the second tunable notch filter are tuned to low loss states in response to one of: (a) the communication device is actively operating in a dual transmission mode and there is no IMD occurrence on a receive carrier frequency; and (b) the communication device is actively operating in a single transmission mode.

Also, in one embodiment, the controller responds to a detection of a switch of the communication device from single transmission mode of operation to a simultaneous, multi-transmission mode by tuning the one notch filter from the out-of-band position to an in-band position relative to a reverse propagating signal from the transmitter in the propagation path in which the one notch filter is employed. With this implementation, the in-band position is a first in-band position of multiple possible in-band positions and the first in-band position provides the specific combined notch filtering response on the propagating signals.

According to one or more embodiments, and as illustrated by the above described figures, the first tunable notch filter and the second tunable notch filter are coupled to outputs of a diplexer to provide a tunable notch diplexer circuit. Also, at least one of the first transmitter and the second transmitter is configured within a respective first transceiver and second transceiver of the communication device, and the first signal and the second signal are respectively a first transmit signal and a second transmit signal. The communication device further comprises: first filter circuitry connected between the first transceiver and at least one antenna and comprising a first duplexer that transmits the first transmit signal in a first transmit frequency band from the first transceiver to the at least one antenna and that transmits a selected one of a first receive signal in a first receive frequency band and a second receive signal in a second receive frequency band. The communication device also comprises second filter circuitry connected between a second transceiver and the at least one antenna and comprising a second duplexer that transmits the second transmit signal in a second transmit frequency band from the second transceiver to the at least one antenna and that transmits another one of the first receive signal in the first receive frequency band and the second receive signal in the second receive frequency band.

Also provided by the communication device is a tunable notch diplexer circuit, where: the first tunable notch filter is connected between the first duplexer and the at least one antenna, and the first tunable notch filter (1) propagates receive signals in a selected first receive frequency band, (2) transmits the first transmit signal in the first transmit band, and (3) attenuates the second transmit signal in the second transmit frequency band. With the tunable notch diplexer circuit, a second tunable notch filter is connected between the second duplexer and the at least one antenna, and the second tunable notch filter (1) propagates receive signals in the second receive frequency band, (2) transmits the second transmit signal in the second transmit band, and (3) attenuates the first transmit signal in the first transmit frequency band. The communication device can also comprise: a first upstream phase adjusting network connected between the first duplexer and the first tunable notch filter which aligns impedances in the other one of the first receive frequency band and the second receive frequency band, with impedances in the second transmit band; and a second upstream phase adjusting network connected between the second duplexer and the second notch filter and which aligns frequency impedances with the selected one of the first receive frequency band and the second receive frequency band and the first transmit band.

In yet another embodiment, the communication device further comprises: a combining circuit, connected between the at least one antenna and a first output of the first adjustable notch filter and a second output of the second adjustable notch filter. The combining circuit adjusts impedances in the first receive frequency band and first transmit frequency band to couple the first receive signal and first transmit signal between the first transceiver and the at least one antenna. The combining circuit also adjusts impedances in the second receive frequency band and second transmit frequency band to couple the second receive signal and second transmit signal between the second transceiver and the at least one antenna. Accordingly, the first tunable notch filter and the second tunable notch filter provides a combined transmit output connected to the at least one antenna, and each of the first adjustable notch filter and the second adjustable notch filter comprise a minimum set of resonators required to reject the second transmit signal and the first transmit signal, respectively. Alternatively, separate antennas can be employed for the first transmit signal and the second transmit signal.

According to one or more embodiments, the tunable notch filter may employ a tunable capacitor in series with a high Q inductor in a band-stop arrangement. According to one or more embodiment, band-stop arrangement comprises at least one of: a series tunable capacitor and inductor connected in shunt; and a shunt tunable capacitor and inductor connected in series. The tunable capacitor may comprise a micro-electro-mechanical switchable (MEMS) capacitor or a MEMS capacitor bank. Alternatively the tunable capacitor filter may employ other tunable devices technologies such as a tunable Barium Strontium Titanate capacitors, or integrated circuit (IC) switchable capacitors or capacitor bank devices. Each of the first tunable notch filter and the second tunable notch filter comprises one of a tunable capacitor and an inductor in a band-stop arrangement, and the tunable capacitor comprising at least one of: (a) a MEMS capacitor; (b) a MEMs capacitor bank; (c) a tunable Barium Strontium Titanate capacitor; (d) an IC switchable capacitor; and (e) an IC switchable capacitor bank device.

Figure 8:
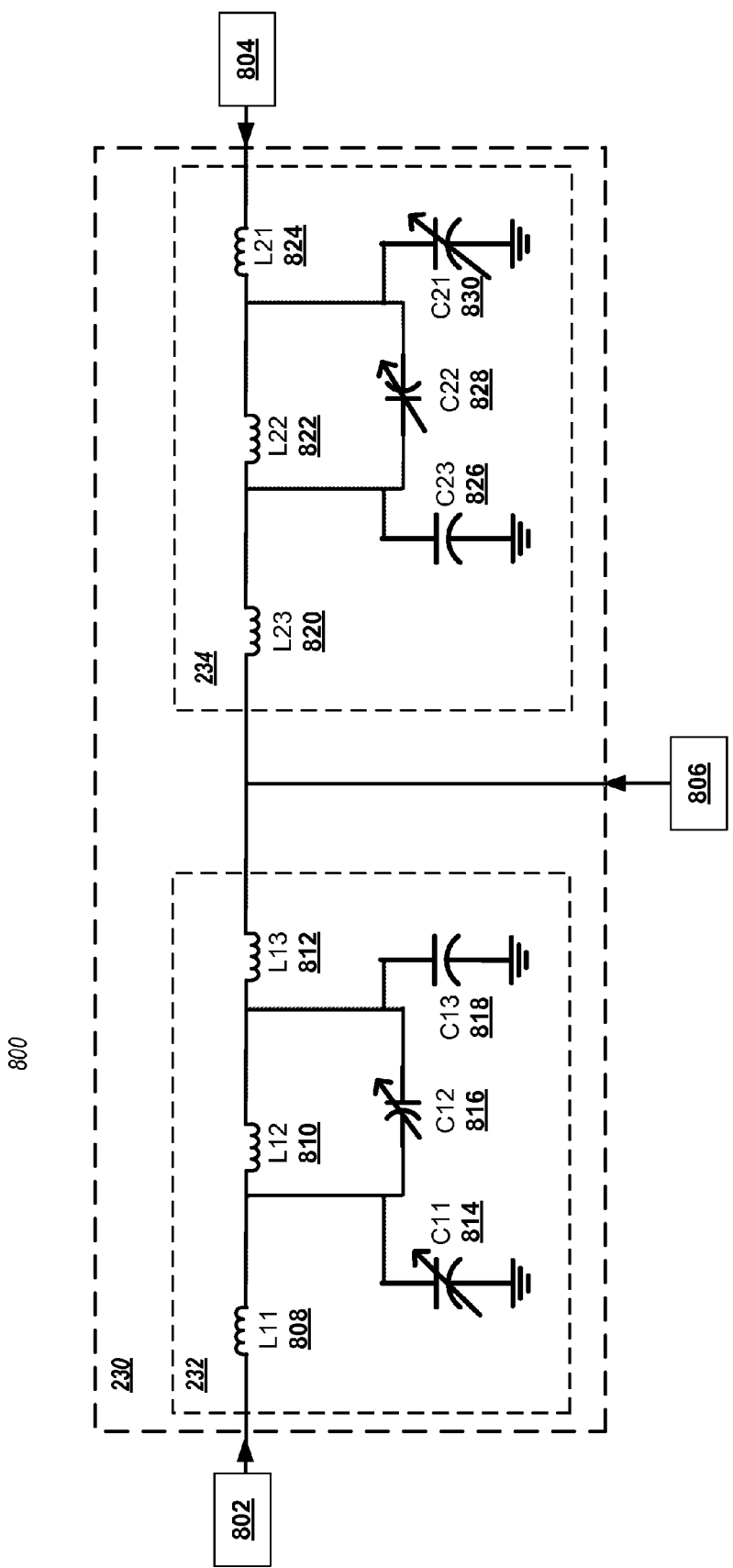
FIG. 8 is a schematic diagram illustrating the component makeup of an example diplexer having two tunable notch filters, as utilized within on or more embodiments of the disclosure.

FIG. 8 illustrates one embodiment 800 of the sub-component makeup of an example diplexer, such as diplexer 230, comprising a first tunable notch filter 232 and second tunable notch filter 234 (FIG. 2). The input of first tunable notch filter 232 is coupled to a first filter output signal 802. The input of second tunable notch filter 234 is coupled to a second filter output signal 804. The outputs of first and second tunable notch filters 232, 234 are coupled together and to antenna signal 806.

In the illustrative embodiment of FIG. 8, signal 802 is a band 12 transceiver signal having transmit frequencies from 698 to 716 MHz and receive frequencies from 728 to 746 MHz, and signal 804 is a band 5 transceiver signal having transmit frequencies from 869 to 894 MHz and receive frequencies from 728 to 746 MHz. Signal 802 couples to a series matching inductor L11 808 having a value of 14 nH. Matching inductor L11 808 couples to a tunable shunt matching capacitor C11 814. Matching inductor L11 808 also couples to a parallel resonator comprising an inductor L12 810 having a value of 3.2 nH and a tunable capacitor C12 816. The other side of the components of parallel resonator (810, 816) couples to a shunt matching capacitor C13 818, having a value of 3.4 pF, and to a series matching inductor L13 812, having a value of 21 nH. The other side of the series matching inductor L13 812 couples to the second tunable notch filter 234 and to antenna signal 806. Signal 804 couples to a series matching inductor L21 824 having a value of 2 nH. Matching inductor L21 824 couples to a tunable shunt matching capacitor C21 830. Matching inductor L21 824 also couples to a parallel resonator comprising an inductor L22 822 having a value of 2.4 nH, and a tunable capacitor C22 828. The other side of the parallel resonator 822, 828 couples to a shunt matching capacitor C23 826 having a value of 1.8 pF and to a series matching inductor L23 820 having a value of 1.5 nH. The other side of the series matching inductor L23 820 couples to the first tunable notch filter 232 and to antenna signal 806. The tunable capacitors C11 814, C12 816, C21 830 and C22 828 are controlled to provide specific capacitor values as determined by a tunable notch filter controller 145 (FIG. 2). It is appreciated that the specific component makeup of and the parameter values associated with the various components are variable and that the configuration illustrated is provided solely for illustration. Further, the functionality provided by the tunable notch filters can, in alternate embodiments, be provided by different components and/or different configuration of components other than those shown, and the scope of the disclosure extends to all equivalent structures that provide the functionality described herein as attributable to a tunable notch filter.

The specific type and capacity or rating of inductance and capacitance utilized within the tunable notch filter is dependent on a plurality of factors. Also, the amount of tuning provided/triggered by the controller for each tunable notch filter can be directly correlated to or dependent on factors that are pre-evaluated to yield the best combined result for insertion loss when only a single transceiver is functional (transmitting signals) and additionally for notch filter isolation, which affects IMD, when a plurality (more than one) of transceivers is functional. According to one or more embodiments, a series of optimizations are conducted on the components (capacitors and inductors) within the tunable notch filter at different band frequencies in order to determine a best combination of values to assign to each component. These analyses yielded results that are near optimal values for IMD performance on the transmit path and receive path for each frequency band at each transceiver.

Tables 900 of FIG. 9 provide a summary of the parameter values that can be utilized by a controller to program two tunable capacitor values in each of a first and second tunable notch filter, such as first tunable notch filter 232 and second tunable notch filter 234. The resulting values for the capacitances are presented in Table 902 for capacitor C11 814, in Table 904 for capacitor C12 816, in Table 906 for capacitor C21 830, and in table 908 for capacitor C22 828. Tables 900 show that, for the illustrative embodiment of FIG. 8, C11 814 is controlled to values ranging from 0.9 to 1.6 pF, C12 816 is controlled to values ranging from 8 to 12 pF, C21 830 is controlled to values ranging from 0.2 to 1.3 pF, and C22 828 is controlled to values ranging from 20 to 32 pF. The controller is programmed to enable the setting of the capacitor components of each tunable notch filter to the discrete value indicated within specific Tables 902, 904, 906, and 908 or within some acceptable offset or range thereto. According to one implementation, design of tunable notch filters can be achieved by maintaining a suitable fixed value for the inductors of the filter and then optimizing the value of one or more of the capacitors between pre-established ranges for each tuning state, in order to minimize insertion loss in the operating band of the connected transceiver and to maximize isolation in the operating band of the other transceiver. In the illustrative embodiment of FIG. 8 and FIG. 9, the controller can select the operating sub-band for Band 5 to one of a low, mid or high sub-bands, and the controller can select the operating sub-band for Band 12 to one of a low, mid or high sub-band. The controller can also provide controls for cases when only Band 5 is active or only Band 12 is active. When both Band 5 and Band 12 are active, the first tunable notch filter 232 provides at least 17 dB of attenuation in the selected sub-band of Band 12, and provides less than 2 dB of insertion loss the selected sub-band of Band 5. When only Band 5 is active the controller provides less than 0.5 dB of insertion loss in Band 5. When both Band 5 and band 12 are active, the second tunable notch filter 234 provides at least 18 dB of attenuation in the selected sub-band of Band 5, and provides less than 1.5 dB of insertion loss the selected sub-band of Band 12. When only Band 12 is active the controller provides less than 0.5 dB of insertion loss in Band 12. In this way, the first and second tunable notch filters 232, 234 can be controlled to provide the required isolation when both Band 5 and Band 12 transmitters are active, thereby reducing the IMD which can couple into the receiver when both transmitters are active. Further, the first and second tunable notch filters 232, 234 can be controlled to provide a minimum amount of insertion loss when only one transmitter is active.

With the above configuration of front-end modules 130 and/or communication device 100, first and second carriers can be isolated by operating a tunable notch filter at the output of the first band transmitter, and tuning the tunable notch filter to the frequency of the second band transmitter when the second band transmitter is active. The tunable notch filter can then be tuned out of band to minimize insertion loss when the second band transmitter is inactive. For example, referring to FIG. 9, for the capacitance values corresponding to the first or second transceiver being in the "off" state, each of the capacitors, C1 and C2 of the first tunable notch filter in the inactive path are tuned to values of the capacitors corresponding to the notch frequencies being out of band, producing a state having minimum insertion loss. However, capacitor values corresponding to the first and second transceivers both operating on an active channel frequency are tuned to values corresponding to the notch frequency being the transmit frequency of the opposing transceiver. The specific values to which the capacitors are tuned are calculated best values for minimizing IMD as well as for minimizing insertion loss. The notch frequency is tunable within a transmit band, rather than having to reject the entire band. This capability allows the notch filter to be tuned exactly onto the second transmit frequency, thereby further enabling intraband operation. For example, referring to FIG. 9, each notch frequency is programmed according to whether the transmit frequencies are in the low, mid or high end of the operating bands.

Figure 6:
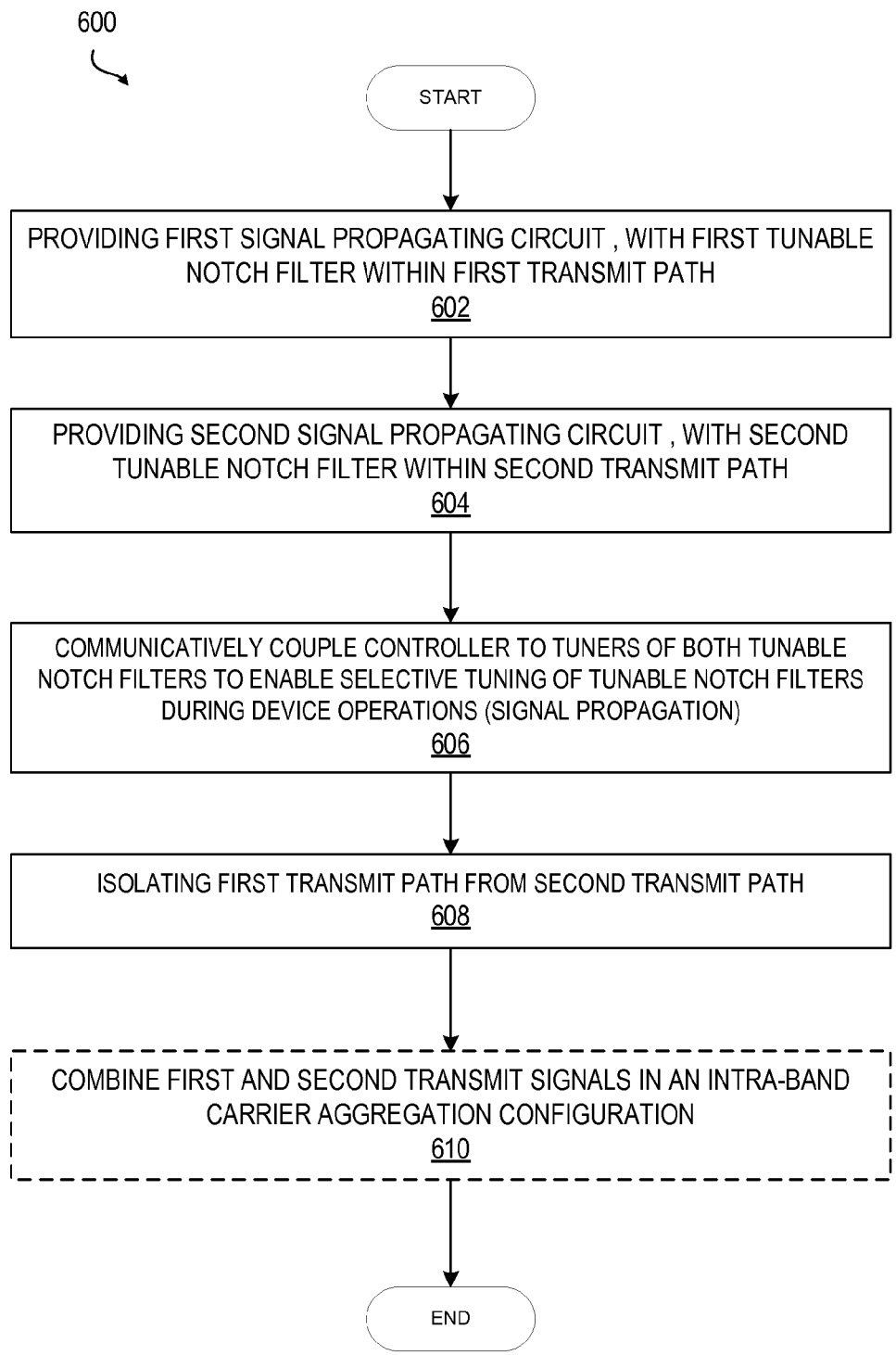
FIG. 6 provides a flow diagram of a method for assembling branching filter circuitry with tunable notch filters for simultaneous transmission by a communication device, according to one or more embodiment.

Referring to FIG. 6, there is depicted a method 600 for designing branching filter circuitry of a communication device, such as communication device 100 (FIG. 1) and branch filtering circuit 140 of FIGS. 1 and 2, according to one embodiment. Method 600 begins at start block and comprises providing a first signal propagating circuit that enables transmission of a first signal from the communication device, where the first signal propagating circuit is configured with a first tunable notch filter coupled within a first transmit path associated with a first transmitter (block 602). Method 600 includes providing a second signal propagating circuit capable of simultaneously transmitting a second signal while the first signal is being transmitted along the first transmit path, where the second signal propagating circuit is configured with a second tunable notch filter coupled within a second transmit path associated with a second transmitter (block 604). Method 600 further comprises communicatively coupling a controller to a first tuning component of the first tunable notch filter and to a second tuning component of the second tunable notch filter (block 606). During signal propagation along one or both of the transmit paths, the controller selectively tunes at least one of the first tunable notch filter and the second tunable notch filter during signal propagation to produce a specific combined notch filtering response that reduces a level of intermodulation distortion (IMD) on at least one receive carrier frequency of at least one propagating signal that propagates along a transmission path including at least one of the first tunable notch filter and the second tunable notch filter. According to one or more embodiments, to selectively tune at least one of the first tunable notch filter and the second tunable notch filter, the controller: detects that the communication device is actively operating in simultaneous, multi-transmission mode; and in response to detecting that the communication device is operating in a simultaneous multi-transmission mode, selectively tunes each of the first tunable notch filter and the second tunable notch filter to a tunable state that reduces the IMD level caused by each transmit carrier frequency of the first signal and the second signal respectively.

Method 600 further comprises isolating the first transmit path from the second transmit path (block 608). Isolating the transmit paths further isolates first and second intra-band carriers on respective transmission paths of the first transmission path and second transmission path, while minimizing an impact of insertion loss during single transmission operation in which only one carrier is present. According to one embodiment, the isolating comprises: providing the first tunable notch filter at an output of a first band transmitter and enabling the controller to tune the first tunable notch filter to a frequency of a second band transmitter in response to the second band transmitter being active; and enabling the controller to tune the frequency of the second tunable notch filter out of band to minimize insertion loss while the second band transmitter is inactive. The transmit path and receive path operates in different band frequencies. According to one aspect of the disclosure, a notch frequency is tunable within a transmit band to allow the first tunable notch filter to be tuned onto the second transmit frequency and the second tunable notch filter to be tuned onto the first transmit frequency band, to enable simultaneous intra-band operation.

In one embodiment, method 600 further comprises: configuring the wireless communication device to combine the first and the second transmit signals in an intra-band carrier aggregation configuration (block 610). With this process, the first and the second transmit signals are combined at an input of a first power amplifier (PA) of a plurality of power amplifiers (PAs), and an output signal of the first PA is split and propagated along a first path having the first tunable notch filter and a second path having the second tunable notch filters. The first tunable notch filter and second tunable notch filter perform respective notch filtering to reduce intermodulation generated in circuits, including duplex filters and radio frequency (RF) switches, between the PA and the at least one antenna.

As one aspect of the design of the notch filters, the first tunable notch filter and the second tunable notch filter each comprise one of a tunable capacitor and an inductor in a band-stop arrangement, and the tunable capacitor comprises at least one of: (a) a MEMS capacitor bank device; (b) a tunable Barium Strontium Titanate capacitor; and (c) an IC switchable capacitor bank device. Further, the band-stop arrangement comprises at least one of: a series tunable capacitor and inductor connected in shunt, and a shunt tunable capacitor and inductor connected in series.

According to one embodiment, the method further comprises configuring the wireless communication device to combine the first and the second transmit signals in an intra-band carrier aggregation configuration. According to this embodiment, the first and the second transmit signals are combined at an input of a first power amplifier (PA) of a plurality of power amplifiers (PAs), and an output signal of the first PA is split and propagated along a first path having the first tunable notch filter and a second path having the second tunable notch filters. The first tunable notch filter and second tunable notch filter perform respective notch filtering to reduce intermodulation generated in circuits, including duplex filters and radio frequency (RF) switches, between the PA and the at least one antenna.

Figure 7:
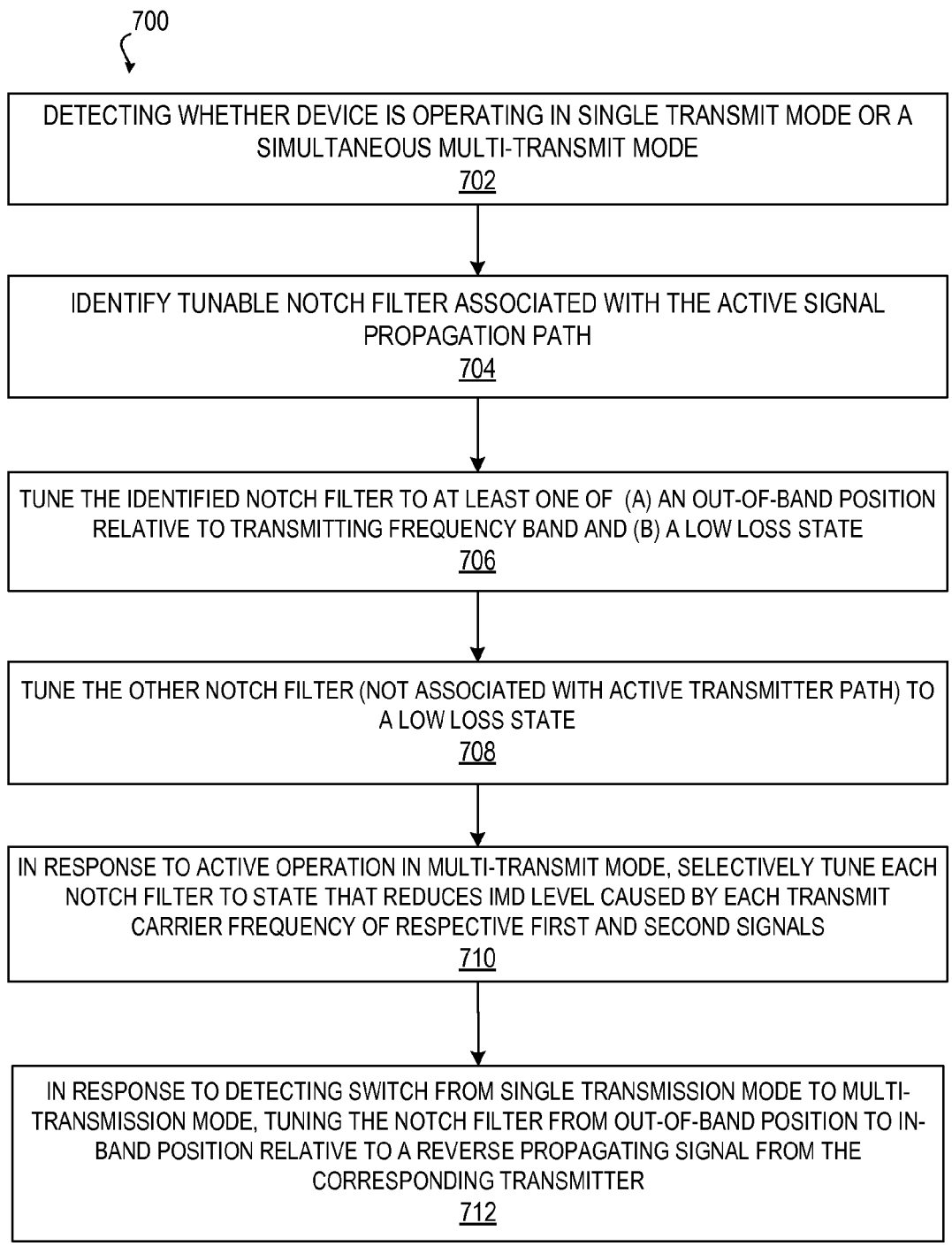
FIG. 7 provides a flow diagram of a method for reducing intermodulation effects in a communication device having tunable notch filters within multiple transmit paths in a multi-transmit configuration according to one or more embodiments.

Turning now to FIG. 7, there is provided a flow chart of a method for reducing intermodulation effects in a communication device having (a) a first tunable notch filter and a second tunable notch filter coupled within a first transmit path and a second transmit path in a multi-transmit configuration and (b) a controller coupled to the first tunable notch filter and the second tunable notch filter for selectively controlling filtering operations on at least one of a first signal and a second signal that can be respectively transmitted from a first transmitter and a second transmitter. Method 700 begins at start block and proceeds to block 702 which indicates the controller detecting whether the communication device is operating in either a single transmit mode or a simultaneous multi-transmit mode. Method 700 then includes: in response to the communication device operating in a single transmit mode, the controller (1) identifying one notch filter of the first tunable notch filter and the second tunable notch filter that is associated with the active signal propagation path (block 704), (2) tuning the identified one notch filter to at least one of an out-of-band position relative to the frequency band of the signal being transmitted via the active transmitter and a low loss state (block 706), whereby an insertion loss of the one notch filter is minimized during single carrier operation; and (3) tuning the other notch filter not associated with the active transmitter path to a low loss state in the active transmitter path (block 708). According to one aspect of the method, the active signal propagation path includes both transmit and receive paths.

Method 700 further includes: in response to the controller detecting that the communication device is actively operating in the simultaneous, multi-transmit mode, the controller selectively tuning each of the first tunable notch filter and the second tunable notch filter to a tunable state that reduces the IMD level caused by each transmit carrier frequency of the first signal and the second signal respectively (block 710). In one implementation, during a multi-transmit mode operation, the first signal and the second signal are respective first and second signals in one of a Simultaneous Voice and Long Term Evolution (SVLTE) propagation, Simultaneous Voice and Data Only (SVDO) propagation, inter-band carrier aggregation (CA) propagation, and intra-band CA propagation. Also, the first tunable notch filter and the second tunable notch filter are tuned to low loss states in response to one of: (a) the communication device is actively operating in a dual transmission mode and there is no IMD occurrence on a receive carrier frequency; and (b) the first tunable notch filter and the second tunable notch filter are tuned to low loss states when the communication device is actively operating in a single transmission mode.

Method 700 also comprises: the controller responding to a detection of a switch of the communication device from single transmission mode to a simultaneous, multi-transmission mode by tuning the one notch filter from the out-of-band position to an in-band position relative to a reverse propagating signal from the transmitter in the propagation path in which the one notch filter is employed (block 712). According to one aspect, the in-band position is a first in-band position of multiple possible in-band positions and the first in-band position provides the specific combined notch filtering response on the propagating signals during device operation in the simultaneous, multi-transmit mode.

In each of the flow charts above, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A radio frequency (RF) communication device comprising:
    a first signal propagating circuit that enables transmission of a first signal from the communication device, wherein the first signal propagating circuit is configured with a first tunable notch filter coupled within a first transmit path associated with a first transmitter;
    a second signal propagating circuit capable of simultaneously transmitting a second signal while the first signal is being transmitted along the first transmit path, wherein the second signal propagating circuit is configured with a second tunable notch filter coupled within a second transmit path associated with a second transmitter; and
    a controller communicatively coupled to a first tuning component of the first tunable notch filter and to a second tuning component of the second tunable notch filter and which: selectively tunes at least one of the first tunable notch filter and the second tunable notch filter to produce a specific combined notch filtering response that reduces a level of intermodulation distortion (IMD) on at least one receive carrier frequency of at least one propagating signal that propagates along a transmission path including at least one of the first tunable notch filter and the second tunable notch filter;
    wherein to selectively tune at least one of the first tunable notch filter and the second tunable notch filter, the controller: detects that the communication device is actively operating in a single transmission mode; and, in response to detecting that the communication device is operating in single transmission mode, detects which one of the first transmitter and the second transmitter is an active transmitter that is currently performing signal transmission within an active signal propagation path and selectively tunes: (a) one notch filter of the first notch filter and the second notch filter that is associated with the active transmitter path to at least one of an out-of-band position relative to the frequency band of the signal being transmitted via the active transmitter and a lower loss state having a different frequency; and (b) the other notch filter not associated with the active transmitter path to a lower loss state having a different frequency, wherein the active signal propagation includes both transmit and receive paths.

2. The communication device of claim 1, wherein to selectively tune at least one of the first tunable notch filter and the second tunable notch filter, the controller: detects that the communication device is actively operating in simultaneous, multi-transmission mode; and in response to detecting that the communication device is operating in a simultaneous multi-transmission mode, selectively tunes each of the first tunable notch filter and the second tunable notch filter to a tunable state that reduces the IMD level caused by the transmit carrier frequency of the second signal frequency and the first signal frequency respectively.

3. The communication device of claim 2, wherein:
    the first tunable notch filter and the second tunable notch filter are tuned to lower loss states having a different frequency in response to one of: (a) the communication device is actively operating in a dual transmission mode and there is no IMD occurrence on a receive carrier frequency; and (b) the communication device is actively operating in a single transmission mode.

4. The communication device of claim 1, further comprising the controller responding to a detection of a switch of the communication device from single transmission mode to a simultaneous, multi-transmission mode by tuning the one notch filter from the out-of-band position to an in-band position relative to a reverse propagating signal from the transmitter in the propagation path in which the one notch filter is employed, wherein the in-band position is a first in-band position of multiple possible in-band positions and the first in-band position provides the specific combined notch filtering response on the propagating signals.

5. The communication device of claim 1, wherein the first signal and the second signal are respective first and second signals in one of a simultaneous voice and Long Term Evolution (SVLTE) propagation, simultaneous voice and data only (SVDO) propagation, inter-band carrier aggregation (CA) propagation, and intra-band CA propagation.

6. The communication device of claim 1, wherein each of the first tunable notch filter and the second tunable notch filter comprise one of a tunable capacitor and an inductor in a band-stop arrangement, and the tunable capacitor comprising at least one of: (a) a micro-electromechanical switchable (MEMS) capacitor; (b) a MEMS capacitor bank device; (c) a tunable Barium Strontium Titanate capacitor; (d) an integrated circuit (IC) switchable capacitor; and (e) an IC switchable bank device.

7. The communication device of claim 6, wherein the bandstop arrangement comprises at least one of: a series tunable capacitor and inductor connected in shunt, and a shunt tunable capacitor and inductor connected in series.

8. The communication device of claim 6, further comprising:
    a combining circuit, connected between the at least one antenna and a first output of the first adjustable notch filter and a second output of the second adjustable notch filter, and which adjusts impedances in the first receive frequency band and first transmit frequency band to couple the first receive signal and first transmit signal between the first transceiver and the at least one antenna, and which adjusts impedances in the second receive frequency band and second transmit frequency band to couple the second receive signal and second transmit signal between the second transceiver and the at least one antenna;

wherein the first tunable notch filter and the second tunable notch filter provides a combined transmit output connected to the at least one antenna; and wherein each of the first adjustable notch filter and the second adjustable notch filter comprise a minimum set of resonators required to reject the second transmit signal and the first transmit signal, respectively.

9. A radio frequency (RF) communication device comprising:
- a first signal propagating circuit that enables transmission of a first signal from the communication device, wherein the first signal propagating circuit is configured with a first tunable notch filter coupled within a first transmit path associated with a first transmitter;
- a second signal propagating circuit capable of simultaneously transmitting a second signal while the first signal is being transmitted along the first transmit path, wherein the second signal propagating circuit is configured with a second tunable notch filter coupled within a second transmit path associated with a second transmitter;
- a controller communicatively coupled to a first tuning component of the first tunable notch filter and to a second tuning component of the second tunable notch filter and which: selectively tunes at least one of the first tunable notch filter and the second tunable notch filter to produce a specific combined notch filtering response that reduces a level of intermodulation distortion (IMD) on at least one receive carrier frequency of at least one propagating signal that propagates along a transmission path including at least one of the first tunable notch filter and the second tunable notch filter;
- first filter circuitry connected between the first transceiver and the at least one antenna and comprising a first duplexer that transmits the first transmit signal in a first transmit frequency band from the first transceiver to the at least one antenna and that transmits a selected one of a first receive signal in a first receive frequency band and a second receive signal in a second receive frequency band;
- second filter circuitry connected between a second transceiver and the at least one antenna and comprising a second duplexer that transmits the second transmit signal in a second transmit frequency band from the second transceiver to the at least one antenna and that transmits another one of the first receive signal in the first receive frequency band and the second receive signal in the second receive frequency band;

wherein:
the first tunable notch filter is connected between the first duplexer and the at least one antenna and the first tunable notch filter (1) propagates receive signals in a selected first receive frequency band, (2) transmits the first transmit signal in the first transmit band, and (3) attenuates the second transmit signal in the second transmit frequency band; and the second tunable notch filter is connected between the second duplexer and the at least one antenna and the second tunable notch filter (1) propagates receive signals in the second receive frequency band, (2) transmits the second transmit signal in the second transmit band, and (3) attenuates the first transmit signal in the first transmit frequency band;

a first upstream phase adjusting network connected between the first duplexer and the first tunable notch filter which aligns impedances in the other one of the first receive frequency band and the second receive frequency band, with impedances in the second transmit band; and a second upstream phase adjusting network connected between the second duplexer and the second notch filter and which aligns frequency impedances with the selected one of the first receive frequency band and the second receive frequency band and the first transmit band;

wherein: the first tunable notch filter and the second tunable notch filter are coupled to outputs of a diplexer to provide a tunable notch diplexer circuit; at least one of the first transmitter and the second transmitter is configured within a respective first transceiver and second transceiver of the communication device; and the first signal and the second signal are respectively the first transmit signal and the second transmit signal.

10. A method comprising:
- isolating a first transmit path from a second transmit path between an antenna and a corresponding first transceiver and second transceiver, wherein said isolating further isolates first and second intra-band carriers on respective transmission paths of the first transmission path and second transmission path, while minimizing an impact of insertion loss during single transmission operation in which only one carrier is present, wherein said isolating comprises:
- providing a first tunable notch filter at an output of a first band transmitter and enabling a controller to tune the first tunable notch filter to a frequency of a second band transmitter in response to the second band transmitter being active; and
- enabling the controller to tune the frequency of a second tunable notch filter at an output of the second band transmitter to a different frequency that is out of band to minimize insertion loss while the second band transmitter is inactive, wherein the transmit path and receive path operates in different band frequencies.

11. The method of claim 10, wherein a notch frequency is tunable within a transmit band to allow the first tunable notch filter to be tuned onto the second transmit frequency and the second tunable notch filter to be tuned onto the first transmit frequency band, to enable simultaneous intra-band operation, and the method further comprises:
- enabling the controller to detect that the communication device is actively operating in a single transmission mode; and,
- in response to detecting that the communication device is operating in single transmission mode:
- detecting which one of the first transmitter and the second transmitter is an active transmitter that is currently performing signal transmission within an active signal propagation path; and
- selectively tuning one notch filter of the first notch filter and the second notch filter that is associated with the active transmitter path to at least one of an out-of-band position relative to the frequency band of the signal being transmitted via the active transmitter and a lower loss state having a different frequency, wherein an insertion loss of the one notch filter is minimized during single carrier operation; and selectively tuning the other notch filter not associated with the active transmitter path to a lower loss state having a different frequency in the active transmitter path, wherein the active signal propagation includes both transmit and receive paths.

12. The method of claim 10, further comprising configuring the wireless communication device to combine the first and the second transmit signals in an intra-band carrier aggregation configuration, wherein the first and the second transmit signals are combined at an input of a first power amplifier (PA) of a plurality of power amplifiers (PAs), and an output signal of the first PA is split and propagated along a first path having the first tunable notch filter and a second path having the second tunable notch filters, wherein the first tunable notch filter and second tunable notch filer performs respective notch filtering to reduce intermodulation generated in circuits, including duplex filters and radio frequency (RF) switches, between the PA and the at least one antenna.

13. A method for reducing intermodulation effects in a communication device having (a) a first tunable notch filter and a second tunable notch filter coupled within a first transmit path and a second transmit path in a multi-transmit configuration and (b) a controller coupled to the first tunable notch filter and the second tunable notch filter for selectively controlling filtering operations on at least one of a first signal and a second signal that can be respectively transmitted from a first transmitter and a second transmitter, the method comprising:

detecting, with the controller, whether the communication device is operating in either a single transmit mode or a simultaneous multi-transmit mode;

in response to said detecting that the communication device is operating in a single transmit mode, detecting which one of the first transmitter and the second transmitter is an active transmitter that is performing signal transmission within an active signal propagation path, and (1) identifying one notch filter of the first tunable notch filter and the second tunable notch filter that is associated with the active signal propagation path and (2) tuning the one notch filter to at least one of an out-of-band position relative to the frequency band of the signal being transmitted via the active transmitter and a lower loss state having a different frequency, wherein an insertion loss of the one notch filter is minimized during single carrier operation;

in response to the communication device operating in the single transmit mode, tuning the other notch filter not associated with the active transmitter path to a lower loss state having a different frequency in the active transmitter path, wherein the active signal propagation path includes both transmit and receive paths.

14. The method of claim 13, further comprising:

in response to the controller detecting that the communication device is actively operating in the simultaneous, multi-transmit mode, the controller selectively tuning each of the first tunable notch filter and the second tunable notch filter to a tunable state that reduces the IMD level caused by each transmit carrier frequency of the first signal and the second signal respectively;

wherein: the first tunable notch filter and the second tunable notch filter are tuned to lower loss states having a different frequency in response to one of: (a) the communication device is actively operating in a dual transmission mode and there is no IMD occurrence on a receive carrier frequency; and (b) the first tunable notch filter and the second tunable notch filter are tuned to lower loss states having a different frequency when the communication device is actively operating in a single transmission mode.

15. The method of claim 13, wherein during a multi-transmit mode operation, the first signal and the second signal are respective first and second signals in one of a simultaneous voice and Long Term Evolution (SVLTE) propagation, simultaneous voice and data only (SVDO) propagation, inter-band carrier aggregation (CA) propagation, and intra-band CA propagation.

16. The method of claim 13, further comprising responding to a detection of a switch of the communication device from single transmission mode to a simultaneous, multi-transmission mode by tuning the one notch filter from the out-of-band position to an in-band position relative to a reverse propagating signal from the transmitter in the propagation path in which the one notch filter is employed, wherein the in-band position is a first in-band position of multiple possible in-band positions and the first in-band position provides the specific combined notch filtering response on the propagating signals during device operation in the simultaneous, multi-transmit mode.

17. The method of claim 15, wherein each of the first tunable notch filter and the second tunable notch filter comprise one of a tunable capacitor and an inductor in a band-stop arrangement, wherein the tunable capacitor comprises at least one of: (a) a micro-electromechanical switchable (MEMS) capacitor; (b) a MEMS bank device; (c) a tunable Barium Strontium Titanate capacitor; (c) an integrated circuit (IC) switchable capacitor; and (e) an IC switchable capacitor bank device, and wherein the band-stop arrangement comprises at least one of: a series tunable capacitor and inductor connected in shunt, and a shunt tunable capacitor and inductor connected in series.

* * * * *